Oct. 4, 1966 KAZUNORI NAGAE ET AL 3,276,071

APPARATUS FOR STRETCHING THE FILM IN TWO AXIAL DIRECTIONS SIMULTANEOUSLY BY USING LINK MECHANISM

Filed Dec. 2, 1963

7 Sheets-Sheet 1

Oct. 4, 1966 KAZUNORI NAGAE ET AL 3,276,071

APPARATUS FOR STRETCHING THE FILM IN TWO AXIAL DIRECTIONS SIMULTANEOUSLY BY USING LINK MECHANISM

Filed Dec. 2, 1963

7 Sheets-Sheet 4

United States Patent Office 3,276,071

Patented Oct. 4, 1966

3,276,071
APPARATUS FOR STRETCHING THE FILM IN TWO AXIAL DIRECTIONS SIMULTANEOUSLY BY USING LINK MECHANISM

Kazunori Nagae, Nobuyuki Takesue, and Tadashi Koyama, all of Kudamatsu, Japan, assignors to Hitachi Limited, Chiyoda-ku, Tokyo, Japan, a corporation of Japan Filed Dec. 2, 1963, Ser. No. 327,258
3 Claims. (Cl. 18—1)

The present invention relates to the manufacture of plastic films and, more particularly, to apparatus for improving the properties of the material consisting of crystalline polymer by stretching in two axial directions, i.e., in longitudinal and lateral directions simultaneously.

In manufacturing a film consisting of polymers such as polyethylene or polypropylene it has heretofore been usually accustomed to improve the physical and optical properties of the film by such means that after the molten polymer is continuously extruded from a spinneret as a film, it is quenched by liquid or gas and the film thus obtained is stretched in the next heating condition into two stages successively in direction of proceeding the film and also in a direction normal thereto, thereby orientating the molecules of the polymer.

In order to insure the uniform molecular orientation in all directions and also simplify the stretching operation and temperature regulation it is profitable to stretch the film along two axial directions, i.e., proceeding direction and normal thereto simultaneously, but there is no perfect stretching method and device among the known stretching processes. The most simple and effective method is to effect simultaneously the lateral stretch to the film by guide rails of divergent arrangement, that is, fixed guide bodies arranged along the diverging form in a plane, to engage the side edge portions of the film formed thick or in bead shape slidably and the stretch in the travelling direction (longitudinal direction of the film) by taking up the film at a speed higher than the supply speed of the film. To effecting the stretching operation by sliding the beaded side edge of the film along such fixed guide body, however, causes different frictional force at each point of the divergent guide body and also the transmission of stretching force to the film in the travelling direction (longitudinal direction of the film) causes unbalance between the force transmitted through the thin middle portion of film and the thick portion of the beaded side edges so that it is very difficult to obtain a film which is uniformly stretched at every portion.

In another known example which improves the above described process there is such a method in which instead of the fixed guide member there is provided a kind of endless conveyor moving in a divergent shape and a number of clips secured to the conveyor engage the beaded side edges of the film to effect the stretching operation, while relatively sliding. In this process also there is relative movement between the clips and beaded portion and the difference is only a smaller relative speed but there is no substantial difference in causing frictional force and in the actual stretching operation, so that there is still difficult problem same as in the former case. The most positive and stable two directional simultaneous stretching operations can be effected by means of a device comprising such a mechanism which is so designed that after the clips have once clamped the side edge portions there occurs no slipping but the speed of the clips gradually increases by uniform acceleration as the film advances without slipping but in the divergent shape. As a known typical example for effecting the above operation there is such a process in which rotatable screws having gradually increasing pitches from its starting point to the end point are arranged in divergent shape along both side edges of the film and a series of endless clips arranged to move along the screw grooves as the guide to effect the two axial stretching operations simultaneously. The disadvantages occurring when effecting stretch according to this process is due to the rectilinear construction of the screw which transmits the uniform acceleration to the clips. The experiments made so far show that a rectilinear stretching section construction develops a considerable stretching trouble and each of the stretch beginning and end sections requires proper curve construction. Its reason is that at the beginning of the stretch it is necessary to provide a rectilinear section parallel along the width of the film in order to positively hold the side edge portions of the film by the clips and at the end of the stretch it is necessary to effect the heat treatment (annealing) and cooling by the same clips under the condition of firmly clamping the side edges of the film without releasing the edges from the clips, thereby effectively avoiding the strain and preventing the occurrence of crease so as to enable the production of a uniformly stretched film.

The principal object of the invention is to provide a novel apparatus for stretching the continuously moving film under the positive and stable conditions into two axial directions simultaneously, and a device therefor.

Another object of the invention is to provide an improved apparatus to stretch a film in two axial directions simultaneously so as to give a continuous film equal and uniform physical and optical properties in all directions.

A further object of the invention is to provide a novel apparatus for effecting a constant acceleration to the clips by means of a link mechanism which enables two axial stretchings simultaneously without causing relative slipping between the side edge portions of the film and the clips.

A still further object of the invention is to provide apparatus for high speed stretching the film by attaching clips at each point on an endless link specially formed like a folding scale and by turning the links as a kind of link chain for simultaneously stretching a continuous film to a divergent form.

The other object of the invention is to provide apparatus for obtaining a required simultaneously stretched film by moving a series of endless links so as to effect heat treatment and cooling successively as the film is clamped under the stretched condition after the continuous film has been simultaneously stretched to a divergent shape.

Generally speaking, the appartus of the invention is so constructed as to effect a continuous motion driven by the sprocket wheels arranged at each end of endless series of link device passing along the fixed guide rails parallel to both sides of the film in the heat treatment process and in the divergent condition in the stretching step, the side portions of the film being clamped by the clips provided for each of series of the links. In order to obtain uniform acceleration of the link in the stretching process, that is, to provide the motion to make the pitch between each of the clips successively increase the dimension of breadth of the guide rail is changed. In order to provide a constant speed movement in the heat treatment process, that is, the movement to make the pitch between clips constant the size of breadth of guide rail is made constant. Thus, the film can be stretched along two axial directions simultaneously and subjected to the continuous heat treatment and cooling by securing the guide rails along a suitable divergent curve to effect the lateral stretch and by changing the dimension of the breadth of the guide rail to effect the longitudinal stretch.

For a better understanding of the invention reference is taken to the accompanying drawings, in which FIG. 1 is a diagrammatic plan view of an apparatus for effecting two axial stretch to a film simultaneously embodying the invention;

FIGS. 4 and 5 are partial plan view respectively illustrating an embodiment of the endless link device of the invention, wherein FIG. 4 illustrates the minimum condition of the pitch of the clip, whilst, FIG. 5 illustrates the maximum condition of the pitch of the clip;

Figure 1:
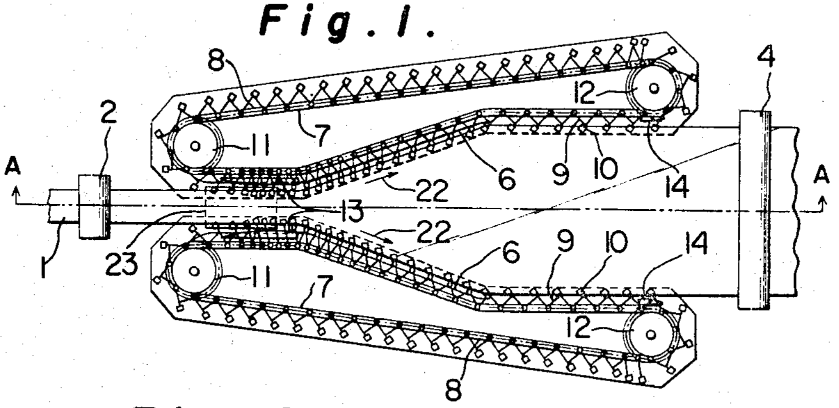

Referring to FIG. 1 which illustrates an embodiment of the invention, 1 represents a film which is delivered towards a set of endless links 9, 9 arranged in a spaced relation side by side to be driven by a pair of feed rollers 2 and 3, which later being driven by a suitable means (not shown). The endless links 9 are driven by sprocket wheels 11 and 12 in endless manner, each link of said endless links 9 is provided with film holding clips 10. Pitches between each clips 10 becomes successively large as the link takes divergent shape by changing the width between guide rails 6, and in the heat treatment step after the completion of stretching and in the return step the pitch between clips 10 may be constant, so that by arranging to provide a constant pitch for the link the guides and 8 may serve only to form the passages. The sprocket wheels 11 and 12 are driven by the sprocket wheels 19 and 20 respectively secured to the same shaft as shown in FIG. 2, whilst the sprocket wheels 19 and 20 are driven by a suitable means (not shown) at the same speed.

When the endless link 9 is moved in the direction shown by the arrow 22 and the film 1 is departed from the feed rollers 2 and 3 the side edges of the film 1 is guided by a guide 23 to be positively clamped by the clips 10 provided for the endless link 9. The clip 10 is so arranged that before it clamps the film it is automatically opened previously at a predetermined position by the opening guide 13 and at the clamping position it is closed automatically. The film 1 of which side edges are successively clamped is stretched along the direction of the arrow 22 in a divergent shape in lateral and longitudinal directions (advancing direction) simultaneously. Through the heat treatment and cooling steps the clip 10 is automatically opened by the opening guide 14 and the stretched film completed the stretching and necessary treatment is delivered out by means of a pair of take out rollers 4 and 5 which are driven by a suitable means (not shown).

Figure 2:
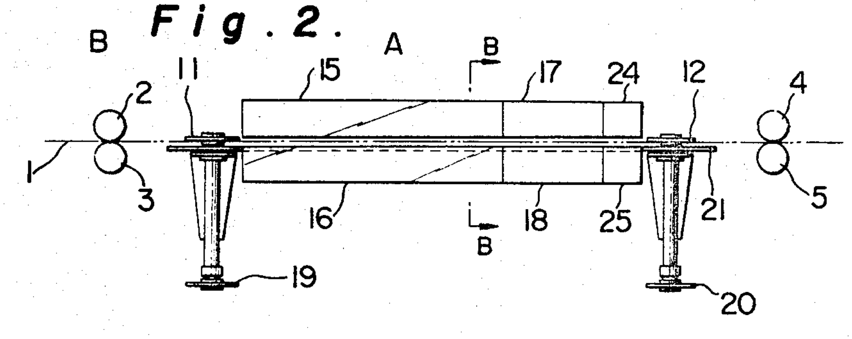
FIG. 2 is a sectional elevation taken on the line A—A of FIG. 1.
Figure 3:
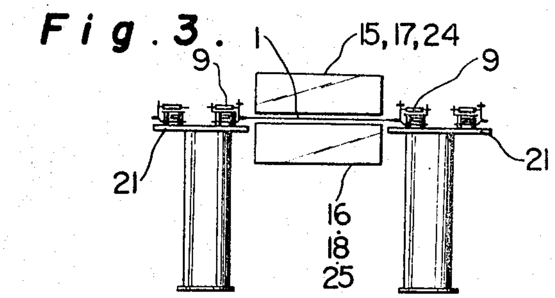
FIG. 3 is its end view.

In order to maintain the film 1 at a desired temperature during the stretching operation a pair of heaters 15 and 16 are arranged as shown in FIG. 2 at the upper and lower positions of the film surface along the inside edge of the film 1 between the endless links 9, 9. In order to maintain a desired temperature similarly during the heat treatment step a pair of heaters 17 and 18 are provided. In the cooling step, in order to cool the film 1 to a predetermined temperature a pair of coolers 24 and 25 are arranged at the upper and lower positions of the surface of film 1. When the stretching operation is effected by the above described apparatus the film 1 is at first passed through the feed rollers 2 and 3, then the position of film 1 is determined through the guide 23 and the attaching operation is completed by manually holding clip 10 stopping at a position for holding the clip 10 of the endless link 9. Then the heaters 15, 16 and 17, 18 as well as the coolers 24 and 25 are operated and after a predetermined temperature has arrived the stretching device is put in operation. Both side edges of film 1, after manually holding the clip 10, are successively clamped automatically by each clip 10, thus the film 1 is laterally and longitudinally stretched simultaneously in a divergent form to complete the heat treatment and cooling and is taken out of the clip 10 by the opening guide 14. The film 1 thus detached off is passed between the take-up rollers 4 and 5 to be taken up, thus entering into the normal continuous operation. The peripheral velocities of take-up rollers 4 and 5 are substantially same as the velocity of the endless link 9, only it is sufficient not to cause sag but it is not necessary to positively take up. The peripheral velocities of the feed rollers 2 and 3 may be substantially same as the velocity of the endless link 9 when the clip provided for the endless link 9 holds the side edge portions of the film 1.

In order to provide uniformly balanced stretched film in all directions there are needed optimum temperature and the rate of two directional stretches according to the material of film. The optimum temperature may be regulated by regulating the heaters 15, 16 and 17, 18 and in order to change the rate of stretch in two directions, that is, lateral and longitudinal directions, at first, as to the lateral direction it is possible by arranging a guide rail by connecting the initial point to the last point of the stretch by a suitable curve in a divergent shape by changing the rate of dimension in a pair of right and left widths of divergent guide rail 6 to be secured to the bed 21 from the starting point of the stretch to the last point of the guide rail. As to the longitudinal direction fully explained later, the pitch between clips 10 is changed within the clamping range of film 1 of the endless link 9 advancing guided by the guide rails 7 and 8 and the rate of stretch in the longitudinal direction can be changed by changing the position of the clip 10 for holding the side edges of film 1, that is, by changing the pitch of the holding clip 10 of smallest pitch at the starting point of the stretch with respect to the clip 10 which has the maximum pitch at the end point of the stretch.

The film 1 consists of a suitable crystalline polymer such as polyethylene or polypropylene having uniform thickness all over the lateral direction of its width or thicker side edges compared with the middle portion, either of which films can be stretched. This is very economical since the weight to be wasted as scrap when trimming the side edges of the film after stretching is less if compared with a known process and apparatus for stretching the film provided with bead-shaped side edge portions.

Figure 4:
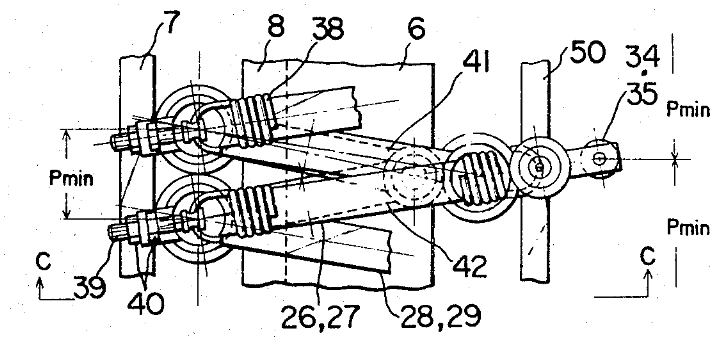
Figure 5:
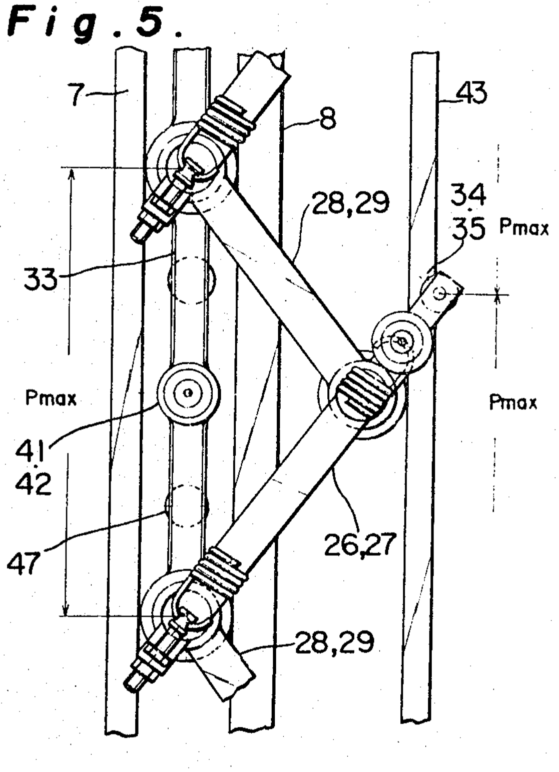
Figure 6:
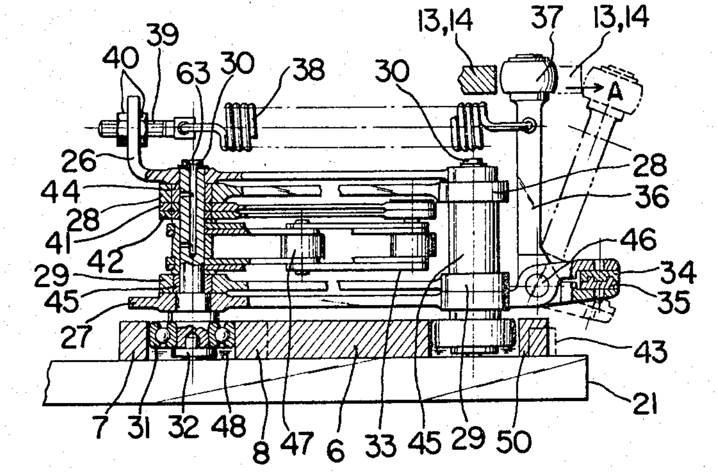
FIG. 6 is a sectional elevation of the essential parts taken on the line C—C of FIG. 4.

An embodiment of novel endless link device to be used for the process and apparatus of the invention is shown in FIGS. 4–6, wherein the guide rails 6, 7 and 8 are secured to the bed 21 in divergent shape or other required shape and an endless link 9 moving guided by the guide rails 6, 7 and 8 consists of an assembly of elements by connecting a pair of inner link plates 28 and 29 by the link shaft 30 to each end pair of outer link plates 26 and 27 and the central distances of the outer link plates 26 and 27 and inner link plates 28 and 29 in which the link shaft 30 is inserted are equal and by connecting them an endless link like a collapsible scale is made. The outside link plates 26 and 27 are force fit to the link shaft 30 not to rotate, while the inner link plates 28 and 29 are fitted to the link shaft 30 by means of bushes 44 and 45 to be rotatable. To the lower end of the link shaft 30 there is provided the ball bearing 31 rolling along the guide rail and the thrust bearing 32 for supporting its own weight of the link and to the extended end of the outside link plate 27 is mounted an L-shaped lever 36 by means of a pin 46 to be opened and closed like a plier relative to the extended end of the outside link plate 27. To the extended end of the outside link plate 27 and to one end of the L-shaped lever 36 are secured a pair of film holding clips 34 and 35 and to the other end of the lever 36 are secured one end of a tension spring 38 and roller 37 for giving to clip 35 the holding force greater than the force necessary for stretching the film and the other end of the tension spring 38 is fixed to one end of the outside link plate 26 by means of an adjusting bolt 39 and nut 40, and when the force does not act on the L-shaped lever 36, that is, when the side surfaces of the opening guides 13 and 14 are located in the full line position in FIG. 6 the clip 35 is closed, whilst when the side surfaces of the opening guides 13 and 14 are located in the position of dot-and-dash lines in the drawing, that is, when the roller 37 of the L-shaped lever 36 is pushed in the direction shown by the arrow A the clip 35 is opened. Accordingly, the endless link 9 is moved by fixing the arcuate opening guides 13 and 14 to definite positions of the beds 21 by the side surfaces so that it enables opening and closing of the clip 35 and the side edges of the film can be clamped or released automatically by the clips 34 or 35.

Each link shaft 30 located on the opposite side of the clips 34 and 35 is connected by bushed roller chain 33 in endless manner and the bushed roller chain 33 is driven by the engagement of the roller 47 and sprocket wheel 11 or 12. When the force does not act on the bushed roller chain 33, i.e., before endless link device clamps the side edge portions of the film and in the stretching step the bushed roller chain 33 is forced to bend in one direction only as shown in FIG. 4 and for this purpose a pair of plates 41 and 42, respectively, are connected at its one end to the link shaft 30 and other end to the central pin of the bushed roller chain 33 in common.

The maximum pitch between adjacent clips, that is, the maximum pitch (Pmax.) of the link shaft 30 is defined by the length of the bushed roller chain 33 as shown in FIG. 5 and the minimum pitch between clips, i.e., the minimum pitch (Pmin.) of the link shaft 30 is defined as shown in FIG. 4 by making the portion to be forced in the link shaft 30 of the outside link plate 27 larger circular shape than the ball-bearing 31, thereby serving as a stopper. When the pitch of the endless link 9 is maximum and minimum the guide rails 6, 7 and 8 form the passages for advancing the endless link 9 acting as a simple guide, whilst when the pitch of the endless link 9 is in the middle portion of the maximum and minimum it is defined by the dimension in the direction of breadth of the guide rail 6.

Accordingly, the shape and arrangement of the guide rail 6 enable to transmit a required stretching force in axial direction to the side edge portions of the film 1 through the clips 34 and 35 to accomplish two axial stretching of the film simultaneously.

In order to facilitate high speed operation of the endless link device oil feed inlet 63 is provided for the link shaft 30 to effect lubrication between the link shaft 30 and bushes 44 and 45 and an oil bath 48 is formed by the guide rails 7 and 8 and the guide rails 7 and 6 to lubricate the ball bearing 31 and thrust bearing 32. For the portion needing no guide rail a weir 43 is provided on the bed 21 to form an oil bath 48. It is necessary to shape the holding surfaces of the clips 34 and 35 for giving longitudinal and lateral two directional stretching force to the side edges of the film to firmly hold the film not to cause slipping and to make a large coefficient of friction.

Figure 7:
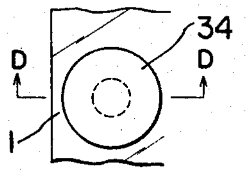
FIG. 7 is a partial plan view for illustrating an embodiment of the clip for clamping the side edges of the film.
Figure 11:
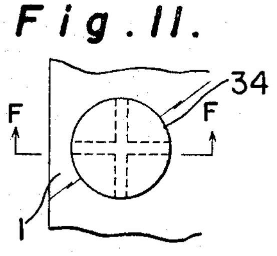
FIG. 11 is a plan view illustrating a modified form of the clip.
Figure 8:
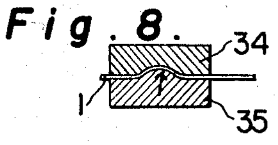
FIG. 8 is a sectional elevation taken on the line D—D of FIG. 7.
Figure 9:
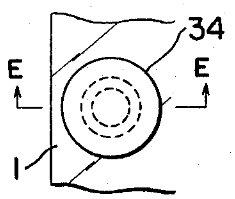
FIG. 9 is a plan view illustrating another embodiment of clip.
Figure 12:
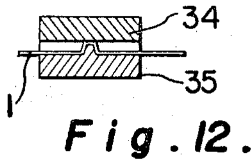
FIG. 12 is a sectional elevation taken on the line F—F of FIG. 11.
Figure 10:
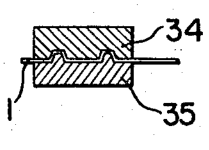
FIG. 10 is a sectional elevation taken on the line E—E of FIG. 9.

An embodiment of most suitable clip of the invention will be explained by referring to FIGS. 7 to 12, wherein FIGS. 7 and 8 show the holding surface of one of the pair of clips 34 formed as concave spherical surface and the holding surface of the other clip 35 formed in the convex spherical surface to hold the side edge portions of the film 1 between these two convex and concave shaped spherical surfaces, thereby enabling to give equal holding force in all directions. FIGS. 9 and 10 show a pair of clips 34 and 35 which have the holding surfaces provided with concave and convex shaped annular portions engaging with each other for holding the side edge portions of the film 1 between them and it enables to have the uniform and powerful holding force in all directions. FIGS. 11 and 12 show a pair of clips 34 and 35 having the crossed concave and convex holding surfaces engaging with each other for holding edge portions of the film 1 between them enabling to have a maximum holding force in longitudinal and lateral two directions.

Figure 13:
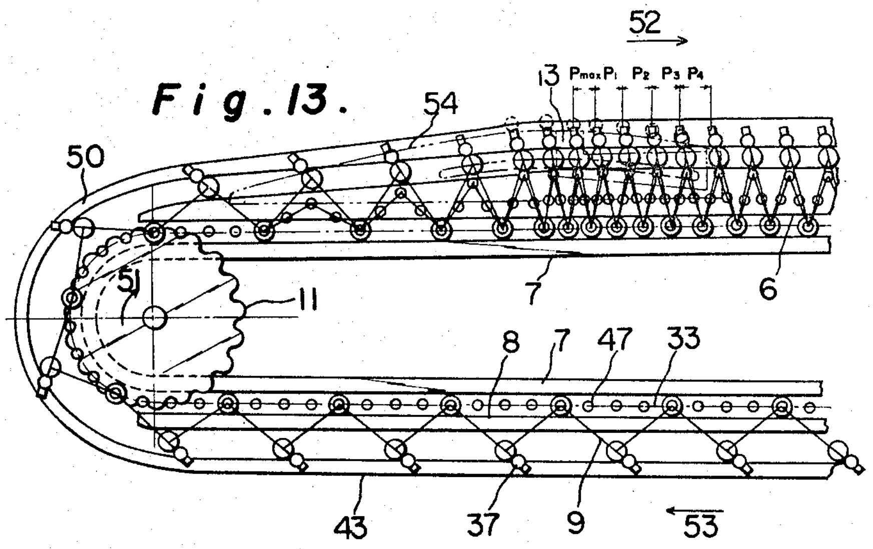
FIG. 13 is a partial plan view of an endless link device illustrating in detail the driving portion and holding portion for holding the side portion of the film of the endless link device.

The manner of driving the endless link 9 by means of sprocket wheels 11 and 12 will be explained by referring to FIG. 13. If the sprocket wheel 11 is rotated in a direction shown by the arrow 51 the endless link 9 advances in a direction shown by the arrow 52 on the slack side, while in a direction of arrow 53 on the tight side, where the tension acts on the bushed roller chain 33 and the guide rails 7 and 8 only define the passage of advancing the endless link 9 and more particularly, care should be taken to the fitting position before they engage the sprocket wheel 11 so as to positively engage. The pitch of bushed roller chain 33 is made to engage the teeth of sprocket wheel 11 having the equal pitch as the chain from the direction of tangent to the pitch circle of the sprocket wheel 11 with a constant pitch by the tensile force and the endless link 9 engaging the sprocket wheel 11 is driven thereby and is forced out to the slack side by the tangential force. For the range within which the endless link 9 is forced out, that is, up to the position where the pitch of the endless link 9 becomes minimum the force acts on the guide rails 7 and 50, while the endless link 9 located at the position advanced from the smallest pitch position, that is, at an intermediate position of the smallest and largest pitch, advances under the tensile force due to the tangential force of the sprocket wheel 12 on the stretching-out side and the force acts on the guide rail 6. The opening guide 13 is movable on a fixed fitting table 54 and one side surface of the opening guide 13 and the fitting table 54 contacting the roller 37 is formed to a suitable circular curved surface in order that the clip 10 opens smoothly and slowly to clamp the side edges of the film. The rate of stretch of the film in the longitudinal direction can be changed by changing the pitch of clips 10 when the side edges of the film is clamped by shifting the opening guide 13 from the minimum position to position $P_1$, $P_2$ and $P_3$ suitably. The manner of driving the endless link 9 on the side of sprocket wheel 12 is same as described above.

Another embodiment of the endless link device will be explained referring to FIGS. 14 to 19, wherein the same or similar parts in FIGS. 4 to 6 are represented by the same reference numerals. In the embodiment shown in FIGS. 14 and 15, a uniform stretch is to be effected by maintaining the angle of clip for the side edges of the film during the stretching operation always at constant independent of the pitch of the endless link which latter consists of a pair of outside link plates 26′ and 27′ connected at each end to a pair of inside link plates 28′ and 29′ by means of link shafts 30′ and 31′. The L-shaped lever 36 is pivoted by a pin 46′ to one end of the plate 57 supported at its one point by the link shaft 31′ and a uniform stretch can be effected by maintaining the plate 57 in a direction normal to guide rails 6, 7 and 50 always during the stretching operation. 55 and 56 represent regulating plates pivoted at one end to the outside link plate 26′ and the inside link plate 28′ by means of a pin 59 and connected at the other end to a pin 58 slidably fitting into a long slot 65 provided for the plate 57, for holding the plate 57 always normal to the guide rails 6, 7 and 50. The driving of the endless link is effected by the provision of roller 60 making the distance between link shafts 30′ one pitch, thereby engaging the sprocket wheel 11. When the endless link is pulled in a direction shown by the arrow 64 the force acts on the guide rails 6, whilst when it is pushed, the force acts on the guide rails 7 and 50 so that by considering such point guide rails 6, 7 and 50 are arranged and secured similarly to FIG. 1.

Figure 14:
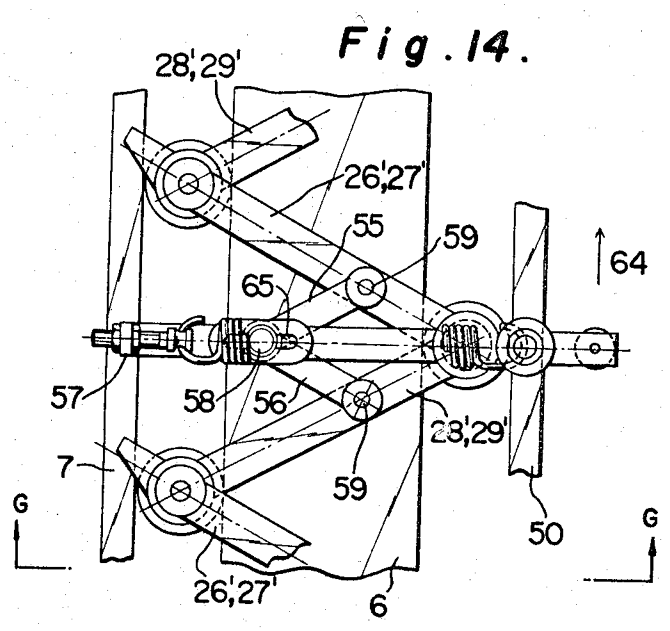
FIG. 14 is a partial plan view for illustrating another embodiment of the endless link device.
Figure 15:
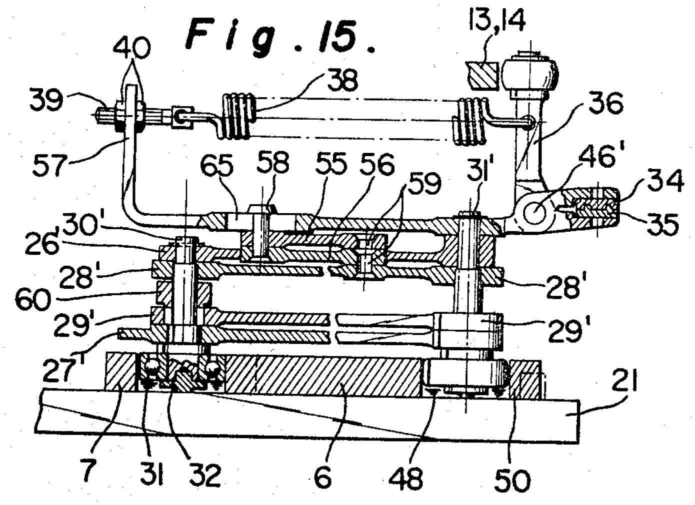
FIG. 15 is a sectional elevation of essential parts taken on the line G—G of FIG. 14.
Figure 16:
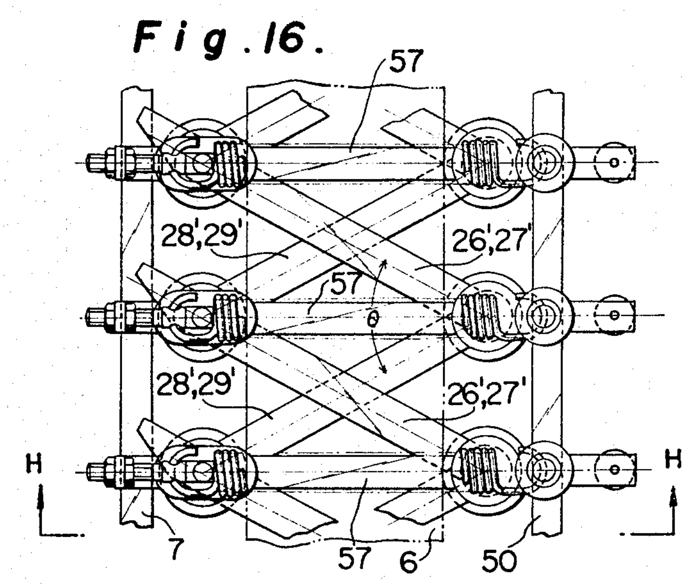
FIG. 16 is a partial plan view illustrating a further embodiment of the endless link device.
Figure 17:
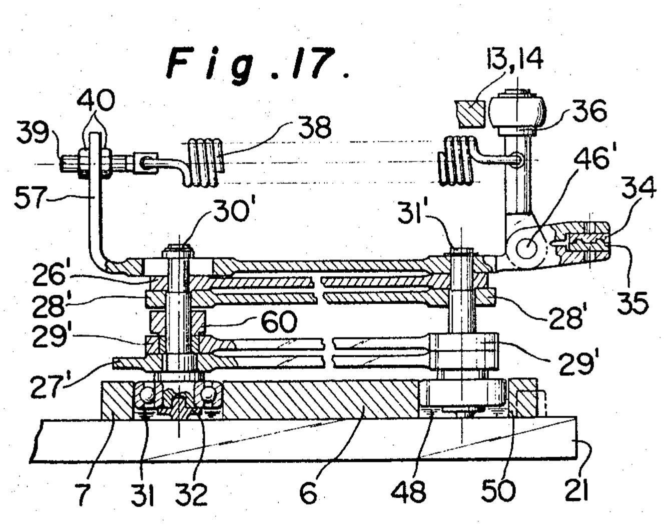
FIG. 17 is a sectional elevation of essential parts taken on the line H—H of FIG. 16.

The embodiment shown in FIGS. 16 and 17 corresponds to such a device in which between one pitch of the endless link device as shown in FIGS. 14 and 15 a similar endless link device is superposed by shifting one-half pitch and connected thereto and if compared with the embodiment shown in FIGS. 14 and 15, the pitch between clips will become ½ when the link angle $\theta$ is same. When the endless link is driven by sprocket wheels the driving power transmitted to the link is greatly reduced as the link angle $\theta$ becomes smaller so that when the pitch between clips is the same the large angle $\theta$ increases the transmission efficiency of the driving force and a larger stretching force can be given in case of two directional stretch of the film.

Figure 19:
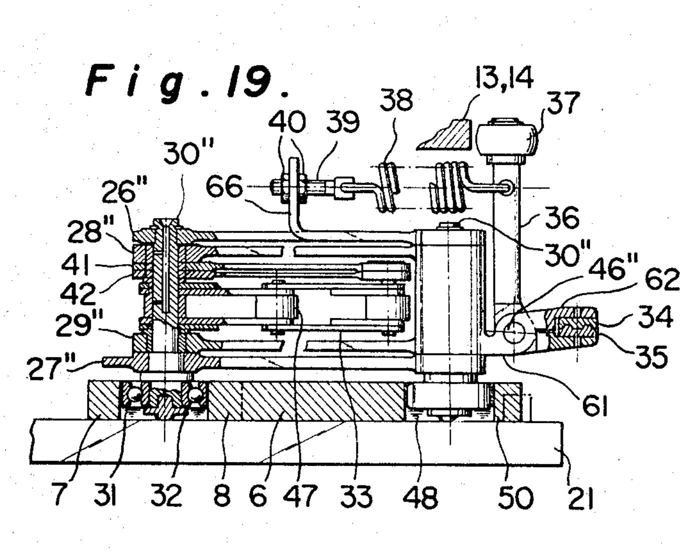
FIG. 19 is a sectional elevation taken on the line K—K of FIG. 18 illustrating the construction of essential parts.
Figure 18:
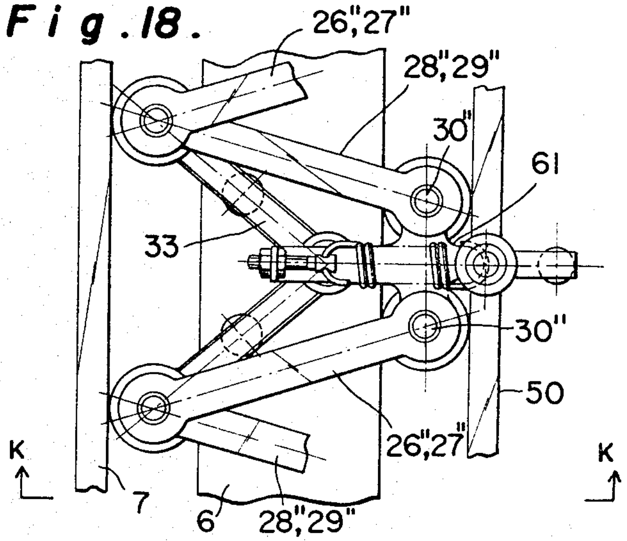
FIG. 18 is a partial plan view illustrating a still further mebodiment of the endless link device.

In the embodiment shown in FIGS. 18 and 19, block 61 is provided on the side of attaching the clip which holds the side edges of the film, to each end of said block 61 is connected one end of the outside link plate 26″ and 27″ and inside link plates 28″ and 29″ by means of shaft 30″ respectively and clip attaching portion 62 and spring attaching portion 66 are formed at its middle portion and to the clip attaching portion 62 is pivoted a L-shaped lever 36 at 46″ and the other ends of the outside link plates 26″ and 27″ and inside link plates 28″ and 29″ are connected by means of link shaft 30″, thereby forming trapezoidal shaped endless link. Accordingly, the direction of film holding clip is always in the direction normal to the guide rail 6 and the stretching force given to the side edges of the film is maintained always at a constant direction, so that a uniform stretch can be effected.

As explained in detail in the foregoing, according to the invention the steps such as heat stretching, heat treating and cooling can be effected continuously without slipping after the side edges of the film is clamped by using a novel endless link device and it enables to give substantially uniform tension, that is, the stretching force, in two axial directions to the entire film and uniform and homogeneously stretched film into two axial directions can be obtained by preventing the crease and sag in case of stretching film.

What we claim is:

1. Apparatus for stretching a film along two axes simultaneously which comprises a first and second endless chain link mechanism positioned astraddle said film and being adapted to grasp the edges of said film and to stretch said film simultaneously along the axis of film advancement and in a direction transverse thereto, each of said endless chain link mechanisms comprising a plurality of links, a plurality of outer link shafts, and a plurality of inner link shafts, each outer link shaft coupling together one end of two adjacent links, each inner link shaft coupling together the free end of one link coupled to said outer link shaft with the free end of the next adjacent link thereby to form an endless linkage which is expandable and collapsible, a first guide means to position the outer link shafts, a second guide means to position the inner link shafts thereby to control the separation between said inner and said outer link shafts and, thus, to control the separation between adjacent inner and adjacent outer link shafts as said chain is advanced, means carried by said inner link shafts to clamp the edge of the film to be stretched, said first and second guide means being positioned at an angle to the axis of said film and converging together to stretch said film both along the axis of film advance and along an axis transverse to said axis, a drive chain comprising a plurality of drive links, each of said drive links carying a drive bushing, each pair of said drive links being hingedly coupled together at one end and having the other end of each drive link coupled to respective adjacent outer link shafts, said pivotal coupling of said drive links permitting said drive chain to deflect as said guide rails change the distance between adjacent inner and outer link shafts, a sprocket drive at each end of said mechanism to drive said mechanism in continuous fashion, said sprocket drives engaging the bushings in said drive chain, said guide rails positioned to separate said inner and outer link shafts to the maximum distance as defined by said drive links stretched between adjacent outer link shafts at the position of said sprocket drives so that said sprocket will engage said drive chain in driving relationship and with a predetermined pitch independent of the variation of said link mechanisms during stretching of said film.

2. Apparatus for stretching a film in accordance with claim 1 in which said clamping means comprises a fixed jaw, a movable jaw pivotably coupled to said fixed jaw, a lever extending beyond said movable jaw and coupled thereto, spring means coupled to said lever to urge said movable jaw into clamping engagement with said fixed jaw, and a clamping guide rail to engage said lever and to move said lever to open said movable jaw as said film clamping means travels toward said film thereby to position the film between said movable and said fixed jaws, said clamping guide rail terminating at the desired point of clamping so that said spring means will return said lever moving said movable jaw towards said fixed jaw, clamping said film therebetween.

3. Apparatus for stretching a film in accordance with claim 2 in which the faces of said movable and said fixed jaws are selectably insertable and are provided with mating indentations for secure clamping engagement of said film.

References Cited by the Examiner

UNITED STATES PATENTS

| | | | |
|---|---|---|---|
| 2,866,231 | 12/1958 | Vaughan | 264—289 |
| 2,923,966 | 2/1960 | Tooke et al | 18—1 |
| 2,928,132 | 3/1960 | Richards | 264—289 |
| 3,046,599 | 7/1962 | Nichols et al. | 18—1 |
| 3,123,854 | 3/1964 | Aykanian | 18—1 |
| 3,148,409 | 9/1964 | Bruckner | 18—1 |
| 3,153,812 | 10/1964 | Sakakibara et al. | 18—1 |

FOREIGN PATENTS

| | | |
|---|---|---|
| 1,111,812 | 7/1961 | Germany. |

WILLIAM J. STEPHENSON, *Primary Examiner.*

ALEXANDER H. BRODMERKEL, *Examiner.*

F. S. WHISENHUNT, *Assistant Examiner.*